(12) United States Patent
Ramaiah et al.

(10) Patent No.: US 12,455,788 B1
(45) Date of Patent: Oct. 28, 2025

(54) MANAGING ONBOARDING FAILURE FOR DISTRIBUTED SYSTEMS

(71) Applicant: Dell Products L.P., Round Rock, TX (US)

(72) Inventors: Mahesh Babu Ramaiah, Bangalore (IN); Jia Yuan Chia, Singapore (SG); Govind Pulikode Mukundan, Singapore (SG)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 18/646,614

(22) Filed: Apr. 25, 2024

(51) Int. Cl.
*G06F 11/14* (2006.01)

(52) U.S. Cl.
CPC ............... *G06F 11/1417* (2013.01)

(58) Field of Classification Search
CPC ............ G06F 11/1417; G06F 11/0781; G06F 9/4401; G06F 11/0772; G06F 11/0784; G06F 11/079; G06F 11/0793
See application file for complete search history.

(56) References Cited

U.S. PATENT DOCUMENTS

| | | | | |
|---|---|---|---|---|
| 6,347,372 B1 * | 2/2002 | Takashima | ............ | G06F 9/4405 709/222 |
| 2006/0236150 A1 * | 10/2006 | Lintz | ............ | G06F 11/1417 714/6.13 |
| 2009/0177787 A1 * | 7/2009 | Ishikawa | ............ | H04L 69/16 709/228 |
| 2014/0095921 A1 * | 4/2014 | Kobayashi | ............ | G06F 11/1417 714/2 |
| 2014/0376405 A1 * | 12/2014 | Erickson | ............ | H04L 9/0861 370/254 |
| 2015/0261966 A1 * | 9/2015 | Mensch | ............ | H04L 63/0876 713/189 |
| 2016/0321082 A1 * | 11/2016 | Hong | ............ | G06F 13/30 |
| 2017/0250814 A1 * | 8/2017 | Brickell | ............ | H04W 12/37 |
| 2022/0179746 A1 * | 6/2022 | Lin | ............ | G06F 11/3692 |
| 2023/0350755 A1 * | 11/2023 | Ramachandra | ............ | G06F 9/45545 |

FOREIGN PATENT DOCUMENTS

CN 102200933 A * 9/2011

* cited by examiner

*Primary Examiner* — Faisal M Zaman
(74) *Attorney, Agent, or Firm* — WOMBLE BOND DICKINSON (US) LLP

(57) ABSTRACT

Methods and systems for managing onboarding of a data processing system (device) are disclosed. During a first startup of the device, the device may use onboarding data to attempt to onboard to a deployment. An occurrence of a failure event that prevents onboarding of the device may be identified by a management controller of the device. Based on the identification, replacement onboarding data for the device may be requested and obtained by the management controller from a management system. Using the replacement onboarding data, the device may perform a second startup to complete onboarding of the device. After completion of onboarding of the device, a computer-implemented service may be provided using the device and/or the deployment.

20 Claims, 10 Drawing Sheets

MANAGING ONBOARDING FAILURE FOR DISTRIBUTED SYSTEMS

FIELD

Embodiments disclosed herein relate generally to device management. More particularly, embodiments disclosed herein relate to systems and methods to manage onboarding of devices.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components, and hosted entities such applications, may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
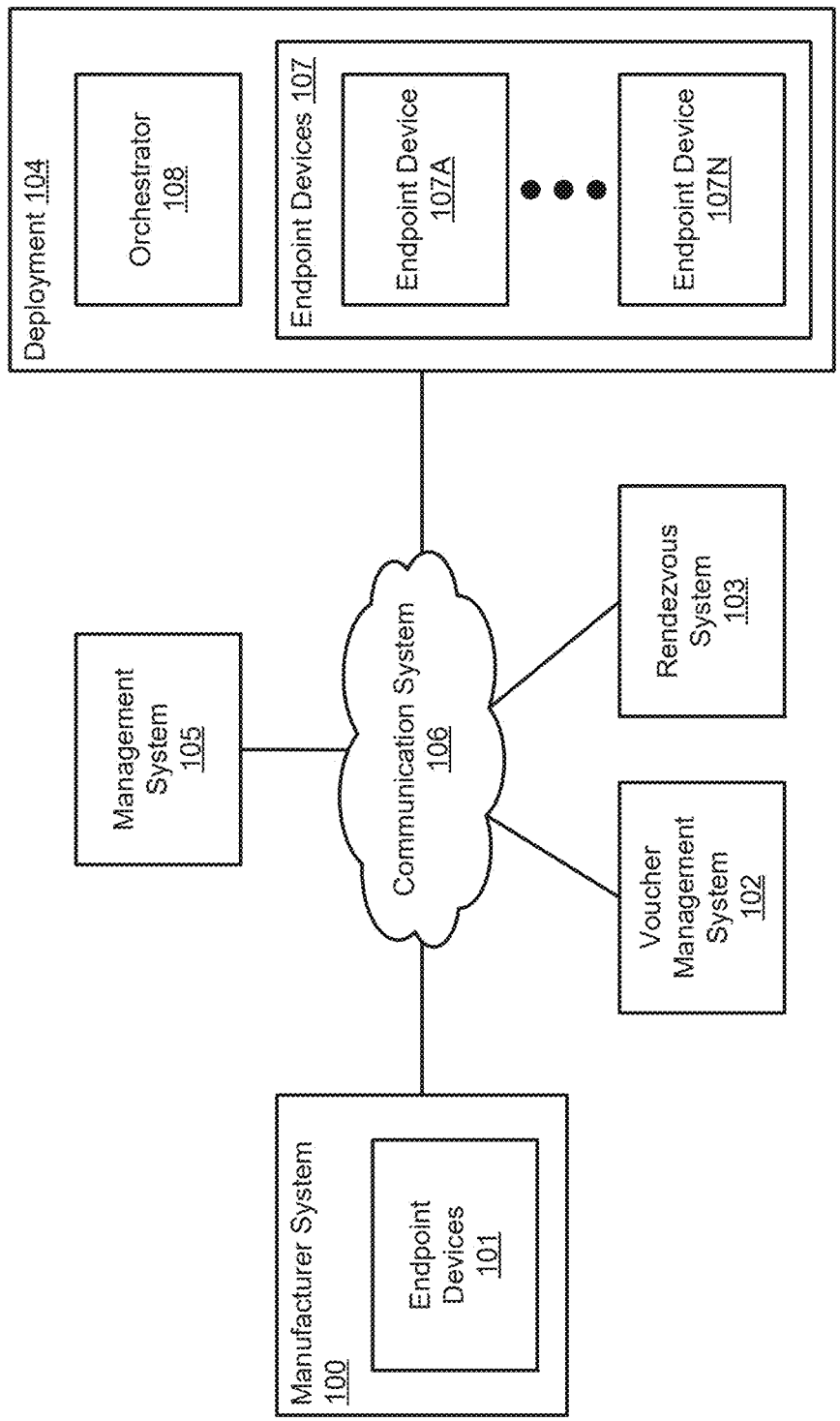
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing onboarding of a data processing system (e.g., an endpoint device). During manufacturing of the endpoint device, the endpoint device, a minimal amount of factory onboarding data may be loaded to hardware resources of the endpoint device.

The factory onboarding data may include data usable to place the endpoint device in an operating state so that the endpoint device may be onboarded to a deployment in accordance with expectations, standards and/or policies of an operator of the deployment. For example, the factory onboarding data may include a factory operating system and embedded configuration data such as a factory rendezvous address, and the factory onboarding data may be used during an initial startup (e.g., boot) of the endpoint device during which an onboarding process may be initiated.

During onboarding of an endpoint device to a deployment, security data (e.g., secrets), configuration data, and/or other data may be installed to the endpoint device so that the endpoint device is able to connect to and/or interact securely with management platforms (e.g., and other devices) of the deployment. For example, during an onboarding process, ownership vouchers and/or other data structures may be used to establish entities that have authority over the endpoint device. Once onboarded, the onboarded endpoint device may provide, along with other devices of the deployment, desired computer-implemented services.

However, if portions of the factory onboarding data are inadequate (e.g., the factory rendezvous address is stale or invalid, the factory operating system is corrupt), then the initial startup of the device may fail, the hardware resources (e.g., in-band components) of the endpoint device may not be initialized, and performance of the onboarding process may be prevented.

In order to resolve the failure, for example, replacement onboarding data (e.g., adequate onboarding data) may be provided to the endpoint device manually (e.g., via a USB key). However, obtaining physical access to the endpoint device to do so may not be practical or timely, and may lead to delays in onboarding, security issues, etc., which may interrupt or prevent provision of the desired computer-implemented services.

Thus, to increase the likelihood of providing the desired computer-implemented services, the replacement onboarding data may be provided to the endpoint device automatically without manual intervention, based on an identified failure during startup of the endpoint device. The replacement onboarding data may be obtained using out-of-band components of the endpoint device independently of inoperable and/or potentially compromised in-band components of the endpoint device.

By doing so, embodiments disclosed herein may facilitate onboarding of endpoint devices while reducing failures due to inadequate factory onboarding data. Accordingly, a system in accordance with embodiments disclosed herein may be less likely to suffer (e.g., suffer at reduced levels) from delays and compromised devices that may expose secrets and/or other data used for onboarding and/or other purposes. For example, the replacement onboarding data may be requested and obtained from a secure server (e.g., a management system) by the out-of-band components of the endpoint device.

Accordingly, embodiments disclosed herein may address, among others, the technical problem of factory onboarding data becoming out of date and/or corrupt over time (e.g., between a time of manufacturing and of the endpoint device and a time of purchase of the endpoint device by a final owner). The disclosed embodiments may do so by implementing a management framework for onboarding of endpoint devices using out-of-band components of the endpoint devices.

In an embodiment, a method for managing onboarding of a data processing system is provided. The method may include identifying, by a management controller of the data processing system, an occurrence of a failure event during performance of a first startup of the data processing system, the failure event preventing onboarding of the data processing system to a deployment using factory onboarding data.

Based on the identification, the method may include: providing, by the management controller and to a management system, a request for replacement onboarding data for the data processing system; obtaining, by the management controller and from the management system, the replacement onboarding data; performing, by the data processing system, a second startup of the data processing system using the replacement onboarding data to complete the onboarding of the data processing system to the deployment; and, providing, by the data processing system, a computer-implemented service after completion of onboarding of the data processing system.

The factory onboarding data may be installed on the data processing system prior to the occurrence of the failure event.

The failure event may include a failure of a startup management entity to handoff management of hardware resources of the data processing system to a management entity of the data processing system. The replacement onboarding data may include a replacement management entity for the data processing system.

The failure event may include failure of the data processing system to communicate with a rendezvous system. The replacement onboarding data may include a replacement rendezvous address usable for performing the onboarding of the data processing.

Performing the second startup may include communicating with the rendezvous system to identify an orchestrator of the deployment using the replacement rendezvous address, and cooperating with the orchestrator to update operation of the data processing system to meet expectations of an operator of the deployment.

Obtaining the replacement onboarding data may include transferring a copy of the replacement onboarding data to a startup management entity hosted by hardware resources of the data processing system so that the replacement onboarding data may be used by the startup management entity during the second startup.

Performing the second startup may include: identifying that a flag was set by the management controller after the replacement onboarding data is obtained; and, based on the flag being set, loading at least one software component to enable use of the replacement onboarding data during the second startup.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1A, a block diagram illustrating a system in accordance with an embodiment is shown. The system shown in FIG. 1A may provide computer-implemented services. The computer-implemented services may include any type and quantity of computer-implemented services. For example, the computer-implemented services may include data storage services, instant messaging services, database services, and/or any other type of service that may be implemented with a computing device.

To provide the computer-implemented services, any number of data processing systems (e.g., endpoint devices) may be deployed to a deployment. The endpoint devices may cooperatively provide the computer-implemented services.

Over time, the resource requirements for providing the computer-implemented services may change and/or endpoint devices may need to be replaced. For example, additional services may be desired to be provided, different types of services may be desired to be provided, etc. In another example, an endpoint device that contributed to the computer-implemented services may cease to operate thereby reducing the quantity of resources available to provide the computer-implemented services. To satisfy the resource requirements based on these changes to an existing deployment, additional endpoint devices may be onboarded and may thereby contribute to the resources available to provide the computer-implemented services.

To manage the addition of new endpoint devices to the deployment, an onboarding process may be performed during a first startup of an endpoint device. The startup process may use factory onboarding data loaded to the endpoint devices at their time of manufacturing to complete the startup process and to initiate the onboarding process. The factory onboarding data may include configuration data, software data, and/or other types of data. For example, the factory onboarding data may include a factory operating system (e.g., a device onboarding operating system) and embedded configuration data such as network addresses for systems that may facilitate onboarding of the endpoint device after the first startup of the device (e.g., a rendezvous server address).

Various tasks may be performed during onboarding, such as establishing authority over the endpoint devices, performing network configuration processes, setting up user accounts, and/or performing other tasks that may render the endpoint devices usable members of the deployment. For example, the endpoint devices must be able to ascertain that they are under the authority of a particular entity. Based on this authority, the entity may, for example, issue work order and/or other types of instructions to manage the operation of the endpoint devices to provide desired computer-implemented services.

However, if portions of the factory onboarding data are inadequate (e.g., stale, corrupt, and/or otherwise unusable for successful startup of the endpoint device), then the first startup of the device may fail, in-band components of the endpoint device may not be operable, and/or onboarding of the endpoint device may be prevented.

For example, upon initiating a first boot of an endpoint device, the factory operating system may fail to complete the boot due to software issues (e.g., corruption, bugs in the software that may only be discovered after the time of manufacturing of the endpoint device), and/or out-of-date configuration data (e.g., a stale embedded rendezvous service location) may prevent the endpoint device from reaching a rendezvous system that may facilitate onboarding for the endpoint device. Under these circumstances, onboarding of the endpoint device may fail (e.g., be prevented).

To identify and/or remediate the onboarding failure may require physical access to the endpoint device. Obtaining physical access to the endpoint device may not be practical or feasible, may lead to delays in completing onboarding, may present additional security issues, etc., which may interrupt provision of the desired computer-implemented services. For example, identification of the onboarding failure may be performed on-site via a service console (e.g., by an administrator that may be tasked with monitoring onboarding of the endpoint device), and/or may require manual uploading of remedial data to the endpoint device (e.g., via USB key).

In general, embodiments disclosed herein may provide methods, systems, and/or devices for managing onboarding of endpoint devices to improve their likelihood of being able to provide desired computer-implemented services. To do so, the endpoint devices may include out-of-band (hardware) components. The out-of-band components may function independently from in-band (hardware) components of the endpoint device (which may be compromised or limited in functionality), allowing for secure and automatic identification of startup failures during device onboarding.

To increase the likelihood of providing the desired computer-implemented services in an event where startup of the endpoint device fails due to inadequate factory onboarding data, (i) the onboarding failure may be automatically identified by the out-of-band components of the endpoint devices, and (ii) suitable (e.g., adequate) replacement onboarding data may be automatically provided to the endpoint device via secure out-of-band communication channels. By doing so, endpoint devices with inadequate factory onboarding data may complete startup and onboarding processes without relying on manual intervention.

To improve the likelihood of being able to provide desired computer-implemented services, embodiments disclosed herein may provide a management framework for onboarding the endpoint devices in a manner that allows for the out-of-band components to automatically identify and/or remediate startup failures of the endpoint devices during onboarding.

The management framework may include processes for identifying failure events during startup of endpoint devices in order to request suitable replacement onboarding data that the endpoint devices may rely on for successful onboarding to a deployment. By using out-of-band components of the endpoint devices, replacement onboarding data may be obtained regardless of the operational state of the in-band components (e.g., which may be negatively impacted by corrupt/stale data), with a reduced risk of the replacement onboarding data and/or the endpoint devices themselves being compromised.

To provide the above noted functionality, the system of FIG. 1A may include manufacturer system 100, voucher management system 102, rendezvous system 103, deployment 104, management system 105, and communication system 106. Each of these components is discussed below.

Manufacturer system 100 may be a system used by a manufacturer of endpoint devices 101. Manufacturer system 100 may include, for example, factories, assembly plants, distribution facilities, and/or other types of facilities for creating endpoint devices 101. Endpoint devices 101 may be data processing systems which may be usable to provide various computer-implemented services.

When manufactured, manufacturer system 100 may put endpoint devices 101 in condition for subsequent onboarding to various deployments (e.g., 104) and/or other environments (e.g., data centers, edge systems, etc.) in which endpoint devices may be positioned to provide desired computer-implemented services.

To place endpoint devices 101 in condition for subsequent onboarding, manufacturer system 100 may (i) establish a root of trust for each endpoint device, (ii) record various information regarding the endpoint devices (e.g., hardware/software loadout, identifiers of various components positioned therein, etc.), (iii) load the endpoint devices with factory onboarding data, and/or (iv) perform other actions. For example, manufacturer system 100 may install various pieces of software, establish various configuration settings, update various hardware components, and/or perform other actions so that only entities to which authority over the endpoint devices has been delegated from the root of trust are able to control and/or otherwise use the endpoint device. Refer to the discussion of FIG. 1D for additional details regarding establishing a root of trust for the endpoint device.

Once constructed, endpoint devices 101 may be sold directly to end users and/or placed into the stream of commerce (e.g., sold to resellers, etc.) and through which endpoint devices 101 eventually reach end users. Refer to the discussion of FIG. 1C for additional details regarding how endpoint devices may reach end users (e.g., individuals, organizations, etc.).

As ownership over the endpoint devices changes, information regarding the changes in ownership and/or authority may be recorded in an ownership voucher. The ownership voucher may allow an end user to establish authority over the endpoint device such that the endpoint device will be usable by the end user.

Voucher management system 102 may document and manage information regarding changes in ownership and authority over endpoint devices 101. To do so, voucher management system 102 may generate ownership vouchers. An ownership voucher may be a cryptographically verifiable data structure usable to establish which entities have authority over endpoint devices 101.

For example, an ownership voucher may include certificate chains that documents the changes in ownership and authority over endpoint devices 101. Each certificate may be signed using various keys. The keys used to sign (e.g., private keys) and keys included in (e.g., public keys) in ownership vouchers may enable endpoint devices to ascertain whether to trust various data structures, such as work orders which may be signed. Refer to the discussion of FIGS. 1E-1J for additional information regarding ownership vouchers.

When one of endpoint devices 101 is obtained by an end user, the end user may add the endpoint devices to a collection, such as deployment 104. When so added, an orchestrator (e.g., 108) or other entity may utilize a corresponding ownership voucher from voucher management system 102 to establish authority over the endpoint device. In this manner, any number of endpoint devices 107 (e.g., 107A-107N) may be brought under the control of a control plane which may include any number of orchestrators (e.g., 108). Different endpoint devices (e.g., 107A-107N) may be onboarded at different points in time and/or for different purposes.

The ownership voucher provided by voucher management system 102 may delegate authority over the endpoint device to the end user by establishing a public key of a public private key pair maintained by the end user as having been delegated authority over the endpoint device. To issue verifiable work orders or other types of instructions to the endpoint device, the work order may need to be signed by the private key of the public private key pair. To establish authority over an endpoint device, orchestrator 108 may have access to the private key.

When one of endpoint devices 101 initially powers on after manufacturing, the endpoint device may reach out to rendezvous system 103. Rendezvous system 103 may be a system that directs endpoint devices to entities such as orchestrator 108 that will onboard the endpoint devices. To do so, the entities such as orchestrator 108 may provide rendezvous system 103 with information usable to authenticate that orchestrator 108 will manage the endpoint devices. For example, orchestrator 108 may provide information from ownership vouchers and/or other sources to rendezvous system 103. Once verified, rendezvous system 103 may redirect endpoint devices to the corresponding entities when the endpoint devices reach out to rendezvous system 103 after being powered on.

However, if an endpoint device is unable to complete startup after being powered on (e.g., due to corrupted portions of the factory operating system), or is unable to establish communication with rendezvous system 103 (e.g., due to a stale or corrupted rendezvous address), then onboarding of the endpoint device may be prevented. To obtain valid operating system software and/or a valid rendezvous system network address, out-of-band components of the endpoint devices may communicate with management system 105 to report the failure to connect, and to request replacement onboarding data for the endpoint devices.

Management system 105 may manage a database of (adequate) onboarding data for a number of endpoint devices. For example, management system 105 may provide suitable replacement onboarding data in accordance with requests from the endpoint devices and/or other entities.

To do so, out-of-band components of the endpoint devices may (i) identify an occurrence of a failure event during a startup of an endpoint device (e.g., the failure event preventing completion of an onboarding process for the endpoint device), and based on the identification, (ii) provide a request for replacement onboarding data for the endpoint device (e.g., to management system 105), (ii) obtain and/or make the replacement onboarding data available to in-band components (e.g., hardware resources) of the endpoint device for use in a subsequent startup of the endpoint device. Refer to the discussion of FIG. 1B for additional details regarding out-of-band components of a data processing system.

By doing so, inadequate factory onboarding data may be replaced with adequate replacement onboarding data automatically in response to the failure event, allowing the endpoint device to complete the subsequent startup and the onboarding process without manual intervention.

Once onboarding is initiated, endpoint devices 107 may perform various operations to complete onboarding. The operations may include any number and type of operation (e.g., configuration operations, security operations, software installation operations, account establishment operations, etc.), and the operations may be directed by orchestrator 108. Once onboarded, the endpoint devices may begin to contribute to computer-implemented services by deployment 104.

When providing their functionality, any of manufacturer system 100, endpoint devices 101, voucher management system 102, rendezvous system 103, deployment 104, management system 105, endpoint devices 107, and/or orchestrator 108 may perform all, or a portion, of the processes, interactions, and methods illustrated in FIGS. 1C-3.

Any of manufacturer system 100, endpoint devices 101, voucher management system 102, rendezvous system 103, deployment 104, management system 105, endpoint devices 107, and orchestrator 108 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), and edge device, an embedded system, local controllers, an edge node, and/or any other type of data processing device or system. For additional details regarding computing devices, refer to the discussion of FIG. 4.

Any of the components illustrated in FIG. 1A may be operably connected to each other (and/or components not illustrated) with communication system 106. Communication system 106 may facilitate communications between the components of FIG. 1A. In an embodiment, communication system 106 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1A as including a limited number of specific components, a system in accordance with an embodiment may include fewer, additional, and/or different components than those illustrated therein.

As discussed above, to manage onboarding of endpoint devices (e.g., 101), the endpoint devices may include out-of-band components.

Figure 1B:
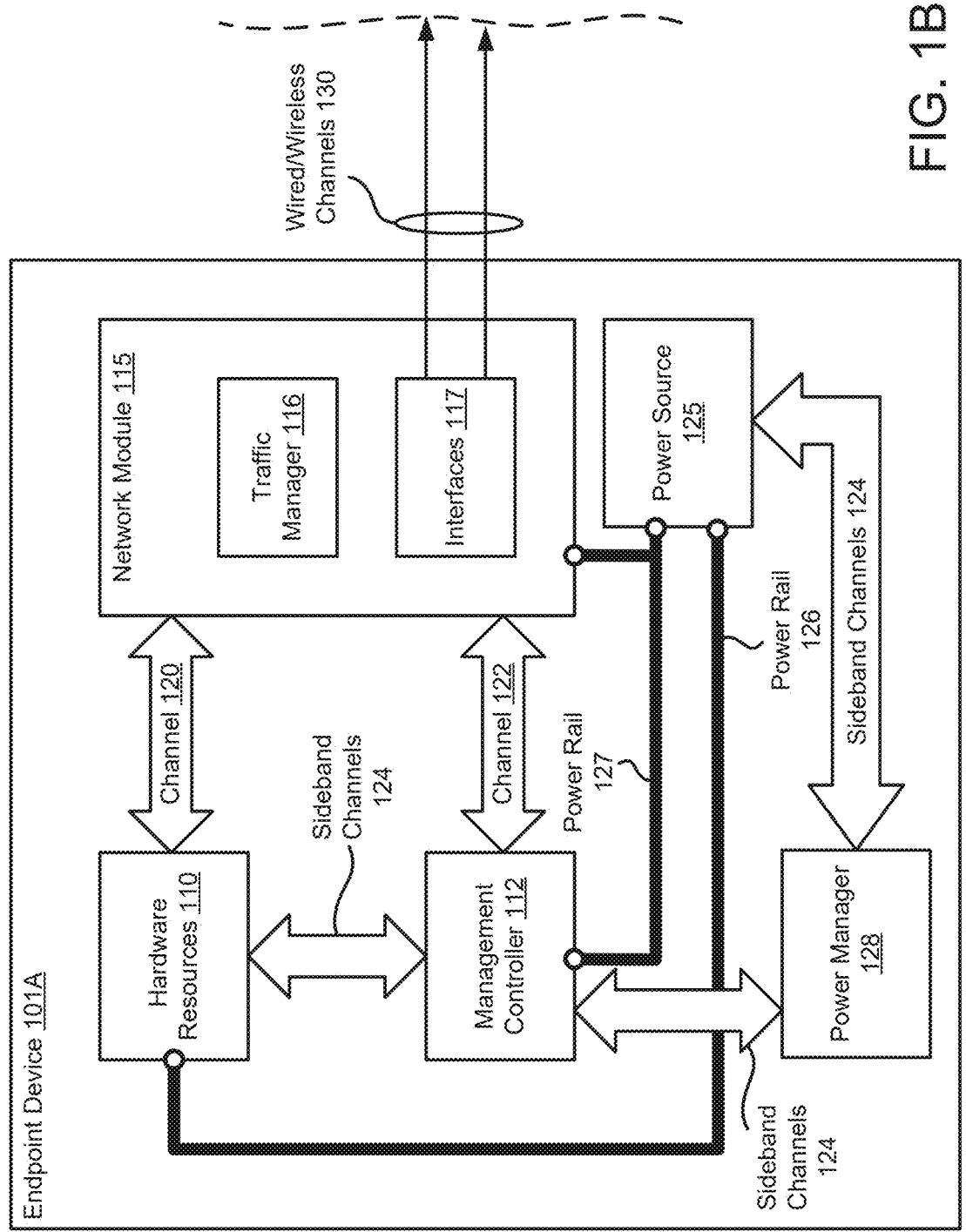
FIG. 1B shows a block diagram illustrating a data processing system in accordance with an embodiment.

Turning to FIG. 1B, a diagram illustrating a data processing system in accordance with an embodiment is shown. The data processing system (e.g., endpoint device 101A) shown in FIG. 1B may be similar to any of the computing devices shown in FIG. 1A (e.g., one of endpoint devices 101).

To provide computer-implemented services, endpoint device 101A may include any quantity of hardware resources 110. Hardware resources 110 may be in-band hardware components, and may include a processor operably coupled to memory, storage, and/or other hardware components.

The processor may host various management entities such as operating systems, drivers, network stacks, and/or other software entities that provide various management functionalities. For example, the operating system and drivers may provide abstracted access to various hardware resources. Likewise, the network stack may facilitate packaging, transmission, routing, and/or other functions with respect to exchanging data with other devices.

For example, the network stack may support transmission control protocol/internet protocol communication (TCP/IP) (e.g., the Internet protocol suite) thereby allowing the hardware resources 110 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, then these entities may subsequently compromise the operation of the applications. For example, if various drivers and/or the communication stack are compromised, then communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 120 to a communication component, which may then send the packaged communication (in a yet further packaged form, in some embodiments, with various layers of encapsulation being added depending on the network environment outside of endpoint device 101A) to another device via any number of intermediate networks (e.g., via wired/wireless channels 130 that are part of the networks).

To reduce the likelihood of the applications and/or other in-band entities from being indirectly compromised, endpoint device 101A may include management controller 112 and network module 115. Each of these components of endpoint device 101A is discussed below.

Management controller 112 may be implemented, for example, using a system on a chip or other type of independently operating computing device (e.g., independent from the in-band components, such as hardware resources 110 of a host endpoint device 101A). Management controller 112 may provide various management functionalities for endpoint device 101A. For example, management controller 112 may monitor various ongoing processes performed by the in-band components, may manage power distribution, thermal management, and/or may perform other functions for managing endpoint device 101A. For example, management controller 152 may monitor various ongoing processes to identify a failure event during a startup process for endpoint device 101A, and in response, may also manage power distribution to manage the failure event.

To do so, management controller 112 may be operably connected to various components via sideband channels 124 (in FIG. 1B, a limited number of sideband channels are included for illustrative purposes, it will be appreciated that management controller 112 may communicate with other components via any number of sideband channels). The sideband channels may be implemented using separate physical channels, and/or with a logical channel overlay over existing physical channels (e.g., logical division of in-band channels).

The sideband channels may allow management controller 112 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 110, management controller 112 may enable information from other devices to be provided to the application without traversing the network stack and/or management entities of hardware resources 110. To do so, the other devices may direct communications including the information to management controller 112.

Management controller 112 may then, for example, send the information via sideband channels 124 to hardware resources 110 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similarly, processes may be used to facilitate outbound communications from the applications.

Management controller 112 may be operably connected to communication components of endpoint device 101A via separate channels (e.g., 122) from the in-band components, and may implement or otherwise utilize a distinct and independent network stack (e.g., TCP/IP). Consequently, management controller 112 may communicate with other devices independently of any of the in-band components (e.g., does not rely on any hosted software, hardware components, etc.). Accordingly, compromise of any of hardware resources 110 and hosted component may not result in indirect compromise of any management controller 112, and entities hosted by management controller 112.

To facilitate communication with other devices, endpoint device 101A may include network module 115. Network module 115 may provide communication services for in-band components and out-of-band components (e.g., management controller 112) of data processing system. To do so, network module 115 may include traffic manager 116 and interfaces 117.

Traffic manager 116 may include functionality to (i) discriminate traffic directed to various network endpoints advertised by endpoint device 101A, and (ii) forward the traffic to/from the entities associated with the different network endpoints. For example, to facilitate communications with other devices, network module 115 may advertise different network endpoints (e.g., different media access control address/internet protocol addresses) for the in-band components and out-of-band components. Thus, other entities may address communications to these different network endpoints. When such communications are received by network module 115, traffic manager 116 may discriminate and direct the communications accordingly (e.g., over channel 120 or channel 122, in the example shown in FIG. 1B, it will be appreciated that network module 115 may discriminate traffic directed to any number of data units and direct it accordingly over any number of channels).

Accordingly, traffic directed to management controller 112 may never flow through any of the in-band components. Likewise, outbound traffic from the out-of-band component may never flow through the in-band components.

For example, during communications with a remote system (e.g., management system 105) in order to obtain replacement onboarding data, messages from the remote system may be addressed to a network endpoint advertised by network module 115 for out-of-band communications. Once a message is received by the network endpoint, traffic manager 116 may then forward the message to management controller 112 via an out-of-band communication channel (e.g., channel 122), differentiating the message from in-band communications to endpoint device 101A, which may be addressed to a different (e.g., separate) network endpoint. Thus, if in-band components of endpoint device 101A are unavailable or unsecured (e.g., potentially compromised), then the replacement onboarding data may be less likely to be intercepted and/or modified, and more likely to be obtained by endpoint device 101A.

To support inbound and outbound traffic, network module 115 may include any number of interfaces 117. Interfaces 117 may be implemented using any number and type of communication devices which may each provide wired and/or wireless communication functionality. For example, interfaces 117 may include a wireless wide area network (WWAN) card, a Wi-Fi card, a wireless local area network card, a wired local area network card, an optical communication card, and/or other types of communication components. These component may support any number of wired/wireless channels 130.

Thus, from the perspective of an external device, the in-band components and out-of-band components of endpoint device 101A may appear to be two independent network entities, which may be independently addressable and/or otherwise unrelated to one another.

To facilitate management of endpoint device 101A over time, hardware resources 110, management controller 112 and/or network module 115 may be positioned in separately controllable power domains. By being positioned in these separate power domains, different subsets of these components may remain powered while other subsets are unpowered.

For example, management controller 112 and network module 115 may remain powered while hardware resources 110 is unpowered. Consequently, management controller 112 may remain able to communicate with other devices even while hardware resources 110 are inactive. Similarly, management controller 112 may perform various actions while hardware resources 110 are not powered and/or are otherwise inoperable, unable to cooperatively perform various process, are compromised, and/or are unavailable for other reasons. For example, if hardware resources 110 are unavailable, then management controller 112 may still request and/or obtain replacement onboarding data.

To implement the separate power domains, endpoint device 101A may include a power source (e.g., power source 125) that separately supplies power to power rails (e.g., power rail 126, power rail 127) that power the respective power domains. Power from the power source (e.g., a power supply, battery, etc.) may be selectively provided to the separate power rails to selectively power the different power domains. A power manager (e.g., power manager 128) may manage power from power source 180, supplied via the power rails (e.g., by providing instructions via sideband channels 124). Management controller 152 may cooperate with power manager 128 to manage supply of power to these power domains. Management controller 152 may communicate with power manager 128 via sideband channels 124 and/or via other means.

In FIG. 1B, an example implementation of separate power domains using power rails 126-127 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 1C:
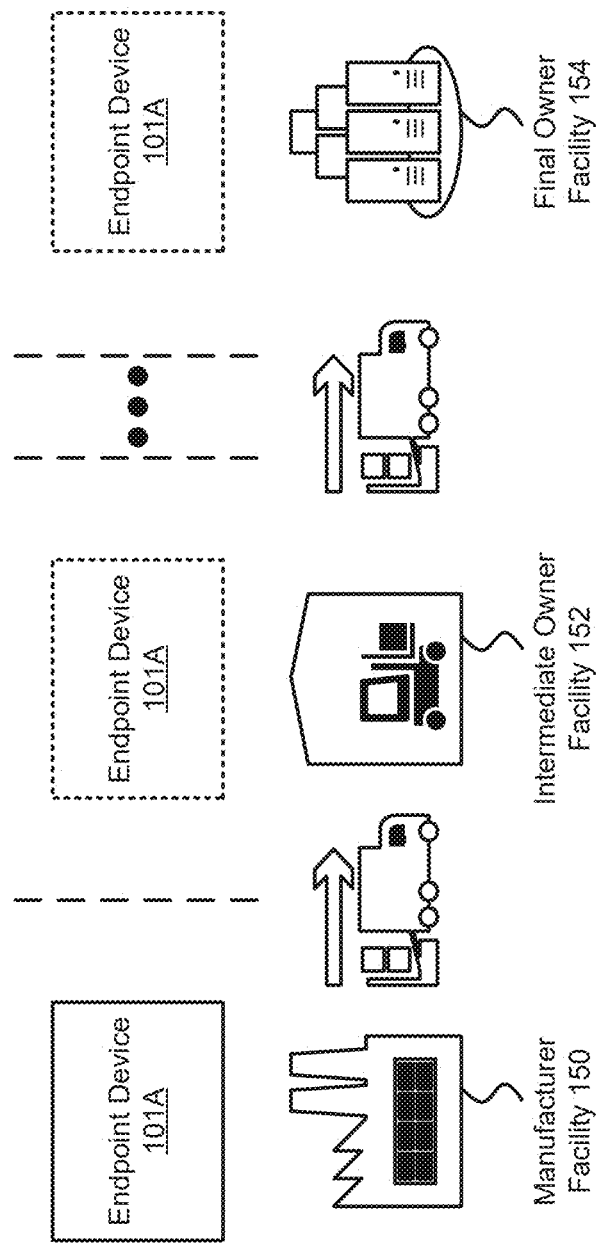
FIGS. 1C-1J show diagrams illustrating aspects of operation of the system of FIG. 1A in accordance with an embodiment.

As discussed above, endpoint devices (e.g., 101) may traverse through a stream of commerce between when the endpoint devices are manufactured and when the endpoint devices reach a final owner. Turning to FIG. 1C, diagram of an example path through a stream of commerce in accordance with an embodiment is shown.

In FIG. 1C, vertical dashed lines indicate different geographic locations in which various facilities may be positioned. Representations of such facilities (e.g., 150-154) may be positioned below a graphical representation of an endpoint device 101A. Representations of movement of endpoint devices between these facilities is illustrated using truck-shaped images. Some instances of the graphical representation of endpoint device 101A are illustrated using dashed outlining to indicate that endpoint device 101A may only be present at one of the facilities at any point in time, and the instance of the graphical representation of endpoint device 101A drawn in solid outlining indicates where endpoint device 101A is located in the example shown in FIG. 1C.

The stream of commerce may begin, for example, at manufacturer facility 150. Manufacturer facility 150 may be a facility operated by a manufacturer of endpoint devices. During manufacturing, the manufacturer may (i) load the endpoint device (e.g., 101A) with factory onboarding data, and (ii) establish a root of trust for an endpoint device (e.g., 101A). The factory onboarding data may be usable to place endpoint device 101A in an operating state so that an onboarding process may be initiated for endpoint device 101A. The root of trust may be used by endpoint device 101A during onboarding to discern which entities have authority over it, which entities to trust, and/or for other purposes. The initial root of trust may indicate that the manufacturer is the owner of and has authority over endpoint device 101A. Refer to the discussion of FIG. 1D for additional details regarding establishing the root of trust for endpoint device 101A.

Once the root of trust is established, endpoint device 101A may be sold and resold to various intermediate owners. These intermediate owners may operate various intermediate owner facilities (e.g., 152), such as warehouses, distribution centers, sales rooms, etc. When sold, endpoint device 101A may be shipped to these various facilities.

Finally, once purchased from an intermediate owner, a final owner may operate a final owner facility (e.g., owner facility 154), such as a data center, edge deployment, and/or other type of computer deployment to which endpoint device 101A may be onboarded. To facilitate onboarding, voucher management system 102 may collect and add information regarding changes in ownership of endpoint device 101A to an ownership voucher. Orchestrator 108 may use the ownership voucher to establish authority over endpoint device 101A. Refer to the discussion of FIG. 1J for additional details regarding establishing authority over endpoint devices during onboarding.

Figure 1D:
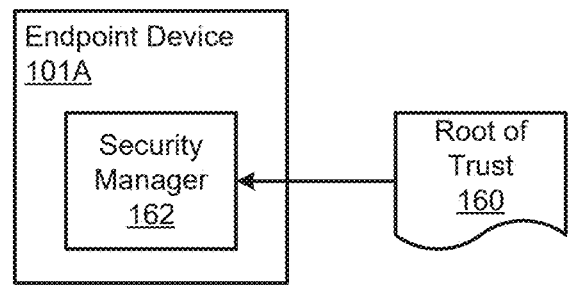

Turning to FIG. 1D, a diagram of an example process for establishing a root of trust in endpoint device 101A in accordance with an embodiment is shown. To establish a root of trust, when endpoint device 101A is manufactured, root of trust 160 may be installed in endpoint device 101A.

Root of trust 160 may be a public key of a public private key pair controlled by the manufacturer of endpoint device 101A. The public private key pair may be established using any process.

To install root of trust 160, root of trust 160 may be stored in endpoint device 101A. The storage location and security precautions taken with respect to storing root of trust 160 may vary depending on the architecture of endpoint device 101A.

For example, endpoint device 101A may host or include a security manager (e.g., 162). Security manager 162 may be implemented using a discrete hardware component, or may be a software component. Security manager 162 may enforce various security policies on endpoint device 101A. For example, the security policies may require that endpoint device 101A validate authority over it back to root of trust 160 before complying with any instructions from other entities that allege to have authority over endpoint device 101A.

To validate entities having authority over endpoint device 101A, endpoint device 101A may utilize ownership vouchers.

Figure 1E:
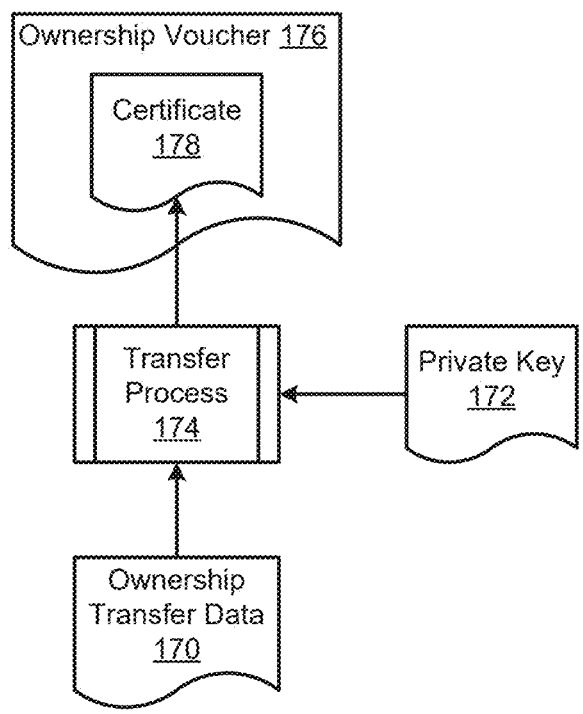

Turning to FIG. 1E, a diagram of an example process for generating ownership voucher 176 in accordance with an embodiment is shown. To generate ownership voucher 176, information regarding changes in ownership and authority over an endpoint device may be added. The information may take the form of a cryptographically verifiable certificate (e.g., 178). Refer to the discussion of FIG. 1F for additional information regarding certificate 178.

To add a certificate to ownership voucher 176, transfer process 174 may be performed. During transfer process 174, ownership transfer data 170 and private key 172 may be obtained. Ownership transfer data 170 may document a change in ownership and/or authority over an endpoint device. For example, when an endpoint device is sold, a public key of a public private key pair controlled by the purchaser may be added to ownership transfer data 170, along with other types of information regarding the transfer. This public key may be usable to verify signed work orders or other signed data structures from the new owner (e.g., the new owner may be able to use the corresponding private key for signing). The information in ownership transfer data 170 may be treated as a delegation statement, which an endpoint device may parse to identify entities having authority over it.

Private key 172 may be a private key of a public private key pair controlled by an entity that has authority over an endpoint device at the time authority over the endpoint device changes (e.g., via sale or other mechanism). In a scenario in which the manufacturer is the seller, the private key corresponding to the root of trust may be private key 172. Similarly, in a scenario in which an intermediate owner is the seller, private key 172 may be the private corresponding to the public key included in the delegation statement in ownership voucher 176 that establishes the intermediate owner has the owner of the endpoint device. In other words, to establish a delegation of authority, the entity that has authority over the endpoint device as defined by the certificates of ownership voucher 176 may need to sign the ownership transfer data 170 to further delegate ownership and authority over the endpoint device. By doing so, a chain of delegations that are cryptographically verifiable back to the root of trust may be established. Refer to the discussion of FIGS. 1G-1I for additional details regarding establishing chains of delegations.

Any number of certificates may be added to ownership voucher 176 thereby enabling certificate chains that establish chains of delegation from the root of trust for an endpoint device. Ownership voucher 176 may, as discussed above, be used during onboarding.

Figure 1F:
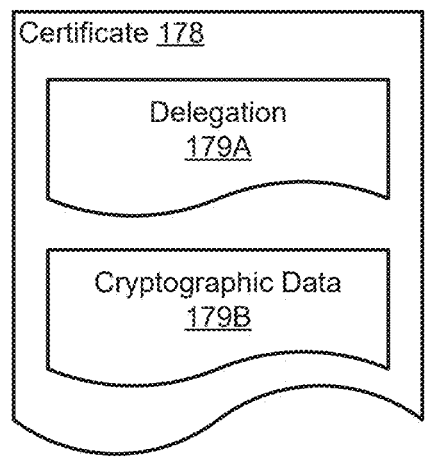

Turning to FIG. 1F, a diagram of an example certificate 178 in accordance with an embodiment is shown. Certificate 178 may include delegation 179A and cryptographic data 179B.

Delegation 179A may include information documenting a delegation of authority/ownership over an endpoint device. For example, delegation 179A may include a public key, and indicate what is delegated to the entity that has control over the public private key pair of which the public key is a member. The extent of what is delegated may be specified at a macro level (e.g., ownership) or a micro level (e.g., limited authority).

Cryptographic data 179B may include signature usable to verify the integrity of delegation 179A and ascertain whether delegation 179A is valid.

To determine whether certificate 178 includes a valid delegation, an endpoint device may attempt to establish a chain of delegations back to the root of trust.

Figure 1G:
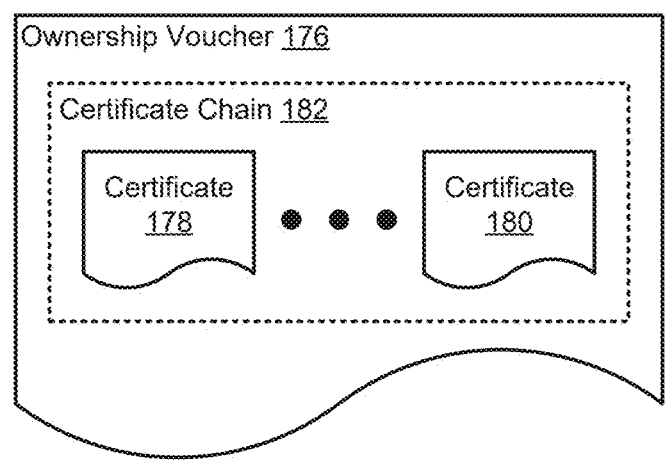

Turning to FIG. 1G, a diagram of an example certificate chain 182 of ownership voucher 176 in accordance with an embodiment is shown. Certificate chain 182 may be a series of certificates that can be sequentially validated back to the root of trust. To sequentially validate the certificate back to the root of trust, the first certificate (e.g., 178) in the chain may attempt to be validated using the root of trust (e.g., a public key). Thus, the first certificate in the chain may only be validated if the private key (e.g., controlled by the manufacturer) corresponding to the root of trust was used to sign certificate 178. Other certificates in the chain may be similarly validated by using the public key from the delegation statement of the previous certificate to check the signature in the next certificate in the chain. Certificate chain 182 may include any number of certificates (e.g., 178-180) that can be sequentially verified back to the root of trust. Refer to the discussion of FIGS. 1H-1I for additional information regarding establishing valid certificate chains.

Figure 1H:
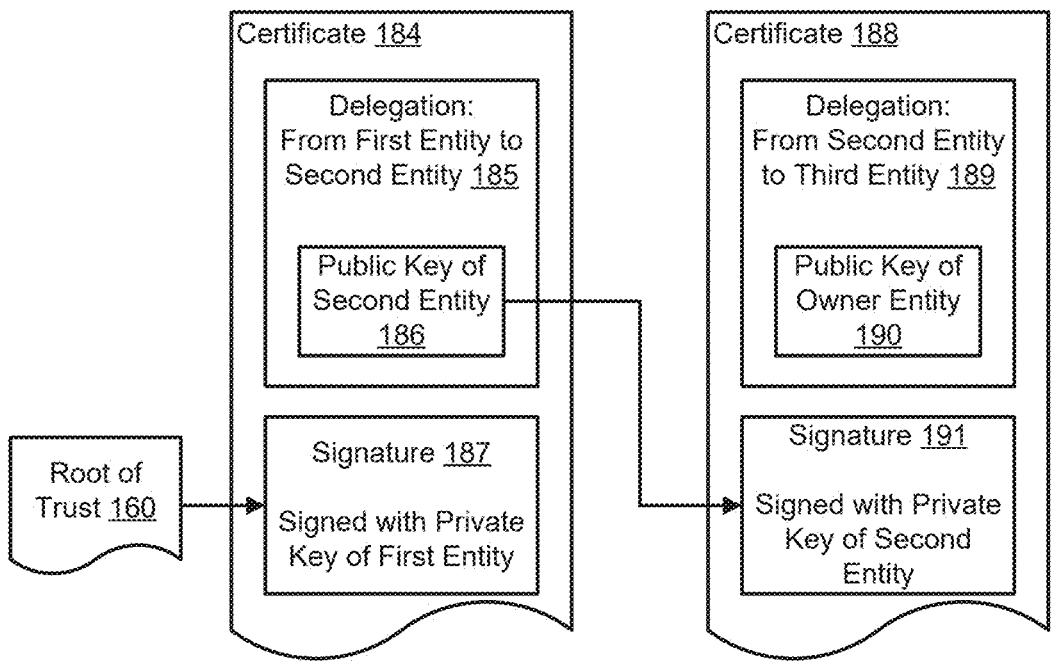

Turning to FIG. 1H, a diagram of an example process for validating a portion of a certificate chain of an ownership voucher in accordance with an embodiment is shown. In FIG. 1H, two certificates (e.g., 184, 188) from a certificate chain are shown.

As seen, certificate 184 may include delegation 185 which includes a public key (e.g., 186) of a second entity. The delegation statement may indicate that a first entity is delegating authority to the second entity.

Certificate 184 may include signature 187. Signature 187 may be generated using a private key controlled by the first entity that delegated authority to the second entity. In this example, the private key may correspond to root of trust 160 (e.g., may be a private corresponding to the public key installed when an endpoint device is manufactured).

To establish a certificate chain, signature 187 may be checked using root of trust 160. If verified as having been signed using the private key corresponding to the root of trust, then certificate 184 may be treated as being valid.

Like certificate 184, certificate 188 may include delegation 189 which includes a public key (e.g., 190) of a third entity, and in this example the owner. The delegation statement of delegation 189 may indicate that the second entity is delegating authority to the third entity (i.e., the owner).

Certificate 188 may include signature 191. Signature 191 may be generated using a private key controlled by the second entity that delegated authority to the third entity. In this example, the private key may correspond to the public key (e.g., 186) of the second entity which may be included in delegation 185.

To extend the certificate chain, signature 191 may be checked using public key of second entity 186. If verified as having been signed using the private key corresponding to public key of second entity 186, then certificate 188 may be treated as being valid.

Once the chain is established, the delegations (e.g., 185, 189) in the chain may be parsed to identify keys to which authority has been delegated from root of trust 160. These public key may then be used to decide whether various work orders are valid, which entities have authority of an endpoint device, and/or for other purposes.

For example, during onboarding, an endpoint device may evaluate whether to perform various work orders using the keys to which authority has been delegated.

Figure 1I:
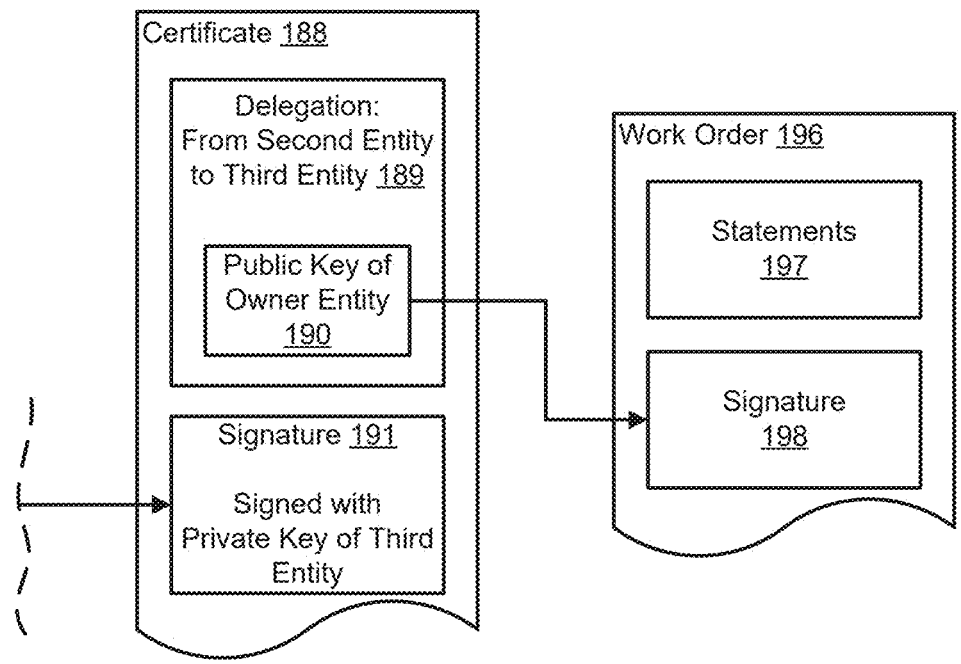

Turning to FIG. 1I, a diagram of an example process for validating a work order in accordance with an embodiment is shown. In FIG. 1I, only a portion of the certificates (e.g., 184, 188) shown in FIG. 1H are shown for clarity.

When a work order (e.g., 196) is received by an endpoint device, the endpoint device may evaluate whether the entity issuing the work order has authority over the endpoint device. To do so, the endpoint device may parse the certificates to identify the public keys to which authority over the endpoint device has been delegated.

The endpoint device may then, using the keys, check a signature (e.g., 198) included in the work order. If the signature can be verified as having been generated using the private key corresponding to one of the public keys to which authority over the endpoint device has been delegated, then the endpoint device may treat work order 196 as having been issued by an entity with authority over it. For example, signature 198 may be checked using public key of owner entity 190, in this example.

The endpoint device may then, for example, process various statements 197 included in work order 196, and take action based on those statements. Statements 197 may include instructions that change the manner of operation of the endpoint device to, for example, comply with security requirements of a new owner, and/or perform other actions.

In some cases, orchestrators or other entities may lack access to the private key to which public key of owner entity 190 and/or other public keys in the certificate chains delegate authority over the endpoint device. Thus, the orchestrators may lack the ability to generate work orders that may be validated by the endpoint devices using information from ownership vouchers.

Figure 1J:
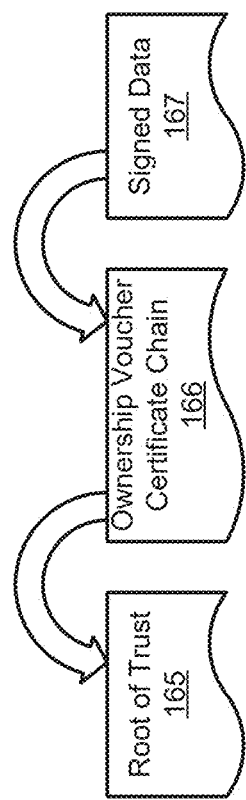

For example, turning to FIG. 1J which shows a diagram in accordance with an embodiment, signed data 167 such as a work order may be validated if public keys included in ownership voucher certificate chains (e.g., 166) correspond to private keys to which the work order issuing entity has access. In this example, ownership voucher certificate chain 166 may be used to establish delegations of authority from root of trust 165 for an endpoint device to the keys used to sign signed data 167.

However, if other signed data is signed using keys that cannot be validated as having authority delegated using ownership voucher certificate chain 166, then the endpoint device may treat the other signed data as not being trustworthy.

Figure 2:
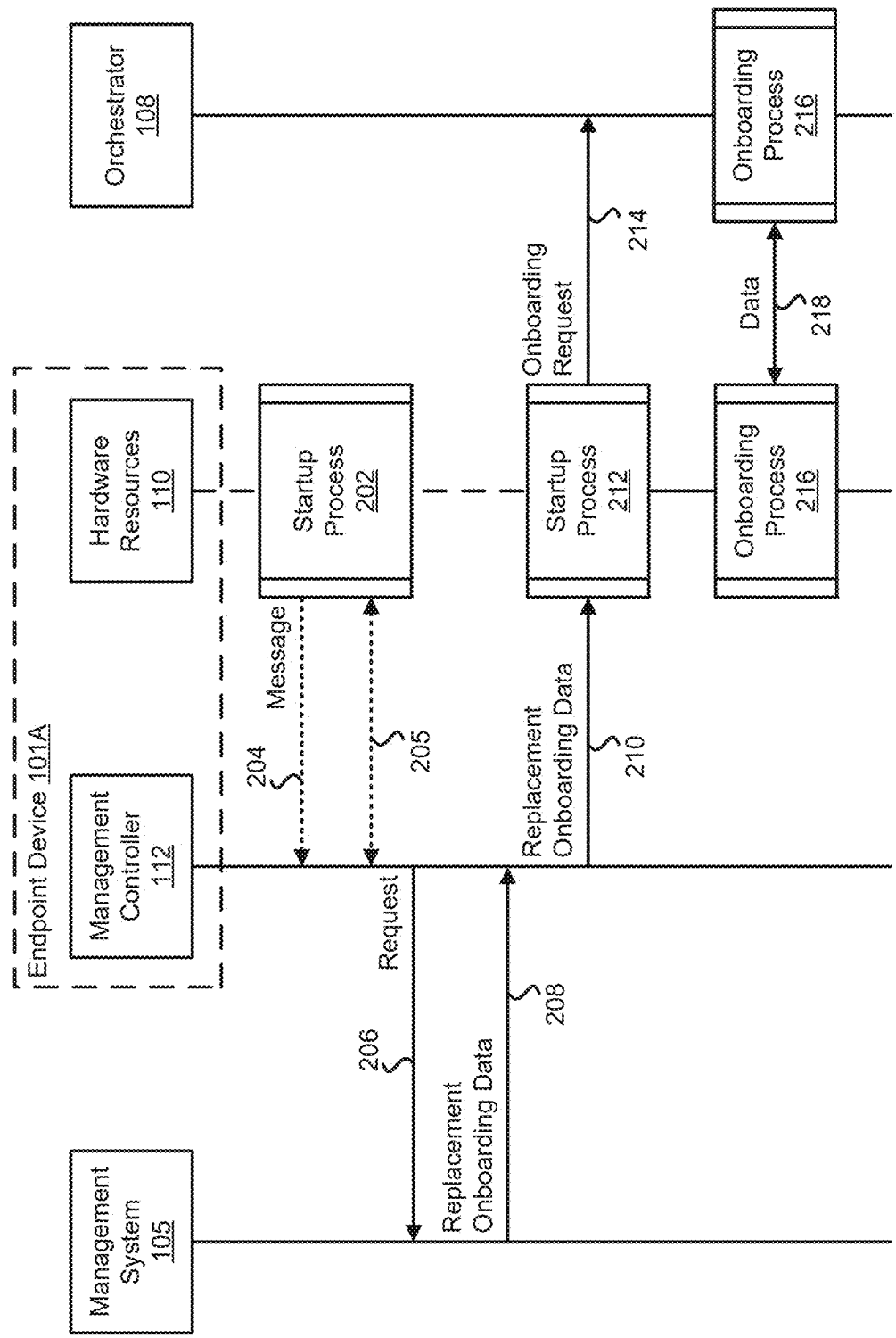
FIG. 2 shows an interaction diagram in accordance with an embodiment.

To further clarify embodiments disclosed herein, an interactions diagram in accordance with an embodiment is shown in FIG. 2. The interaction diagram may illustrate how data may be obtained and used within the system of FIGS. 1A-1J.

In the interaction diagrams, processes performed by and interactions between components of a system in accordance with an embodiment are shown. In the diagrams, components of the system are illustrated using a first set of shapes (e.g., 105, 110, etc.), located towards the top of each figure. Lines descend from these shapes. Some descending lines are drawn solid to indicate that the corresponding component is operating during the corresponding period of time. Other descending lines are drawn in dashing to indicate that the corresponding components may not be operating, powered on, present in the system, and/or not participating in operation of the system for other reasons during the corresponding period of time. For example, in FIG. 2, hardware resources 110 of endpoint device 101A may not be operable until startup process 212.

Processes performed by the components of the system are illustrated using a second set of shapes (e.g., 202, 212, etc.) superimposed over these lines. Interactions (e.g., communication, data transmissions, etc.) between the components of the system are illustrated using a third set of shapes (e.g., 204, 206, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur. Lines terminating in one or two arrows that are drawn in dashing (e.g., 204, 205) may indicate that the interaction is optional and/or that performance of the interaction is situationally dependent.

Generally, the processes and interactions are temporally ordered in an example order, with time increasing from the top to the bottom of each page. For example, the interaction labeled as 204 may occur prior to the interaction labeled as 206. However, it will be appreciated that the processes and interactions may be performed in different orders, any may be omitted, and other processes or interactions may be performed without departing from embodiments disclosed herein.

Turning to FIG. 2, an interaction diagram in accordance with an embodiment is shown. The interaction diagram may illustrate processes and interactions that may occur during onboarding of an endpoint device.

To onboard endpoint device 101A, a startup process (e.g., 202) for endpoint device 101A may be performed. In the example shown in FIG. 2, an entity (e.g., a final owner) may have purchased endpoint device 101A (e.g., from a manufacturer, an intermediate owner), and endpoint device 101A may have reached its destination location (e.g., a data center, edge deployment, etc.). For example, the final owner may desire to onboard endpoint device 101A to a deployment managed, in part, by orchestrator 108.

Prior to endpoint device 101A arriving at its destination location, (i) factory onboarding data may be loaded to endpoint device 101A (e.g., by the manufacturer), (ii) an ownership voucher for endpoint device 101A may be updated based on the purchase, and/or (iii) other actions may be performed that may facilitate startup and/or onboarding of endpoint device 101A.

The factory onboarding data may include a limited amount of data usable to initiate onboarding for endpoint device 101A to a deployment operated by an owner. For example, the factory onboarding data may include a factory management entity (e.g., a factory operating system), and rendezvous system information (e.g., a factory rendezvous address).

To update the ownership voucher (e.g., to prepare endpoint device 101A) for onboarding, orchestrator 108 may send a voucher request to a voucher management system (e.g., not shown, 102). The voucher request may be a request for an ownership voucher for an endpoint device (e.g., 101A). Based on the purchase of endpoint device 101A by the entity, the voucher management system may add information to the ownership voucher for endpoint device 101A that establishes chains of certificates/delegations from the root of trust to the owner.

When received, the voucher management system may attempt to validate the voucher request by performing a validation process. During the validation process, credentials and/or other information from orchestrator 108 may be evaluated to ascertain whether an ownership voucher should be provided. Presuming that the validation process is successful, the voucher management system may send an ownership voucher to orchestrator 108.

Once obtained, orchestrator 108 may send a registration request to a rendezvous system (e.g., 103). The registration request may be a request to have the rendezvous system redirect endpoint device 101A to orchestrator 108. The registration request may include information usable by the rendezvous system to verify that orchestrator 108 should have authority over endpoint device 101A.

After endpoint device 101A has arrived at its destination location, endpoint device 101A may be powered on, causing startup process 202 to be initiated. Startup process 202 may include a first (e.g., initial) startup process for endpoint device 101A. During startup process 202, a startup management entity (e.g., a BIOS) may begin to execute and may perform various actions using the factory onboarding data in order to place hardware resources 110 in condition to handoff to a management entity.

For example, hardware resources 110 may perform a secure boot process that may include secure component verification processes, disk partitioning processes, validation of software components, and/or other actions to prepare for handoff to the factory operating system. Once handed off, the factory operating system may run various applications in order to initiate an onboarding process for endpoint device 101A. However, if the factory onboarding data is inadequate, then startup process 202 may fail, preventing onboarding of endpoint device 101A to the deployment.

In a first example, a failure event may occur when the factory operating system fails to complete startup process 202 due to inadequate configuration data embedded in the factory operating system, such as an invalid (e.g., incorrect, stale) factory rendezvous address. In this case, the factory operating system may load (e.g., the kernel may be stable), but some necessary applications may fail to run. If the rendezvous address is invalid, then endpoint device 101A may be unable to reach the rendezvous system (e.g., to which orchestrator 108 is registered), and therefore may not be redirected to orchestrator 108, which may be necessary in performance of the onboarding process for endpoint device 101A.

The factory operating system may attempt a number of boot retries (e.g., up to a maximum number of retries as defined by configuration data of the factory onboarding data). During the penultimate boot (e.g., the last boot attempt before the maximum number of retries is reached), the factory operating system may provide information regarding the failure event to management controller 112 via a message. The message may include information regarding the failure event, such as a failure type, process or activity logs, information regarding the factory onboarding data (e.g., a version identifier), etc.

At interaction 204, the message may be provided to management controller 112 by hardware resources 110. For example, the message may be generated provided to management controller 112 via (i) transmission of the message, (ii) storing in a storage with subsequent retrieval by management controller 112, (iii) a publish-subscribe system where management controller 112 subscribes to updates from hardware resources 110 thereby causing a copy of the message to be propagated to management controller 112, and/or (iv) other processes.

In a second example, a failure event may occur when the factory operating system fails to load, due to corruption (e.g., corrupted partitions of the factory operating system image) and/or due to instability of the factory operating system (e.g., bugs, errors). In this case, the factory operating system may be unable to boot past the kernel, which may limit operation of portions of hardware resources 110, which may be necessary in performance of the onboarding process for endpoint device 101A.

At interaction 205, management controller 112 may monitor activity of hardware resources 110 to identify the failure event and/or to obtain information regarding the failure event. Refer to the discussion of FIG. 1B for more details regarding functionality of management controller 112.

Upon identifying the failure event, management controller 112 may obtain (e.g., generate) a request for replacement onboarding data based on the information regarding the failure event. The request may include information regarding endpoint device 101A (e.g., identifiers), the information regarding the failure event, a message indicating that at least a portion of replacement onboarding data is being requested, and/or other information (e.g., information usable to validate authenticity of management controller 112 and/or endpoint device 101A).

At interaction 206, the request may be provided to management system 105 by management controller 112. For example, the request may be generated provided to management system 105 via (i) transmission via a message, (ii) storing in a storage with subsequent retrieval by management system 105, (iii) a publish-subscribe system where management system 105 subscribes to updates from management controller 112 thereby causing a copy of the request to be propagated to management system 105, and/or (iv) other processes. By providing the request to management system 105, management system 105 may provide data services for endpoint device 101A.

To provide the data services, management system 105 may validate authenticity of management controller 112 (e.g., using information included in the request, such as device identifiers and/or cryptographically verifiable data structures). Management system 105 may identify replacement onboarding data for endpoint device 101A based on the request. For example, management system 105 may manage a database of (adequate) onboarding data for a number of endpoint devices.

The replacement onboarding data may be usable to replace at least a portion of the factory onboarding data. For example, the replacement onboarding data may include a replacement management entity (e.g., an up-to-date version and/or fresh copy of factory onboarding data), a replacement rendezvous address (e.g., a valid rendezvous address to which orchestrator 108 is registered), and/or other data. The replacement onboarding data may include cryptographically verifiable data structures so that, when provided to endpoint device 101A, the replacement onboarding data may be validated as being trustworthy.

At interaction 208, the replacement onboarding data may be provided to management controller 112 by management system 105. For example, the message may be generated provided to management controller 112 via (i) transmission via a message, (ii) storing in a storage with subsequent retrieval by management controller 112, (iii) a publish-subscribe system where management controller 112 subscribes to updates from management system 105 thereby causing a copy of the replacement onboarding data to be propagated to management controller 112, and/or (iv) other processes.

Upon receiving the replacement onboarding data, management controller 112 may validate authenticity of the replacement onboarding data, make the replacement onboarding data available to hardware resources 110, and/or perform other actions. For example, management controller 112 may set a boot intercept flag that may instruct the startup management entity to perform special operations during a subsequent startup of endpoint device 101A, such as loading specific software components to enable access to the replacement onboarding data. By doing so, hardware resources 110 may use the replacement onboarding data to perform a second startup of endpoint device 101A.

At interaction 210, (a copy of) the replacement onboarding data may be provided to hardware resources 110 by management controller 112. For example, the replacement onboarding data may be generated provided to hardware resources 110 via (i) transmission via a message, (ii) storing in a storage (e.g., shared storage) with subsequent retrieval by hardware resources 110, (iii) a publish-subscribe system where hardware resources 110 subscribes to updates from management controller 112 thereby causing a copy of the replacement onboarding data to be propagated to hardware resources 110, and/or (iv) other processes. By providing the replacement onboarding data to hardware resources 110, the startup management entity hosted by hardware resources 110 (e.g., the BIOS) may use the replacement onboarding data during the second startup of endpoint device 101A (e.g., during startup process 212).

Startup process 212 may be different from startup process 202. For example, startup process 212 may include loading software components (e.g., drivers, other software components that may not be loaded during startup process 202) that allow the startup management entity to access the replacement onboarding data that was previously obtained (e.g., stored) by management controller 112.

Hardware resources 110 may initiate startup process 212 upon receiving and/or in anticipation of receiving the replacement onboarding data. The replacement factory operating system may be stable and/or otherwise in a condition so that the startup management entity may be successful in handing off management of hardware resources 110 to the replacement factory operating system.

During startup process 212 and under the management of the replacement factory onboarding system, hardware resources 110 may establish communication with a rendezvous system (e.g., 103) using the replacement rendezvous address included in the replacement onboarding data. For example, hardware resources 110 may send a request to the rendezvous system regarding which entity to contact as part of an onboarding procedure. The request may include identifying information for endpoint device 101A and/or other information (e.g., cryptographically verifiable data structures).

Presuming that the rendezvous system registered orchestrator 108 (e.g., prior to endpoint device 101A arriving at its destination location), the rendezvous system may provide data to hardware resources 110. The data may include, for example, various validation information and re-direct information (e.g., a network address) for orchestrator 108. Based on the obtained data, endpoint device 101A may initiate communication with the orchestrator in order to perform onboarding operations for endpoint device 101A.

At interaction 214, an onboarding request may be provided to orchestrator 108 by hardware resources 110. For example, the onboarding request may be generated provided to orchestrator 108 via (i) transmission via a message, (ii) storing in a storage with subsequent retrieval by orchestrator 108, (iii) a publish-subscribe system where orchestrator 108 subscribes to updates from hardware resources 110 thereby causing a copy of the onboarding request to be propagated to orchestrator 108, and/or (iv) other processes. The onboarding request may request, for example, cryptographic data such as ownership vouchers. The request may initiate a cooperatively performed onboarding process (e.g., 216) by endpoint device 101A and orchestrator 108.

At interaction 218, hardware resources 110 may exchange data with orchestrator 108 during performance of cooperative onboarding process 216 (e.g., via transmission of a message, via storage and retrieval, via a publish-subscribe system, and/or via other processes)

During onboarding process 216, orchestrator 108 may provide endpoint device 101A with the ownership voucher and/or other information to enable endpoint device 101A to ascertain whether orchestrator 108 has authority over endpoint device 101A (e.g., at interaction 218). To do so, endpoint device 101A may attempt to validate certificate chains and delegation statements to establish a chain of delegation of authority from the root of trust to orchestrator 108 (e.g., the delegation statements may identify a particular public key for which orchestrator 108 controls a corresponding private key). Endpoint device 101A may issue various challenges (e.g., signing challenges) to orchestrator 108, and endpoint device 101A may test the signed responses to the challenges using the particular public key. If the signed responses can be validated using the public key, then endpoint device 101A may conclude that orchestrator 108 has authority over it.

If successfully validated as having authority over it, endpoint device 101A may continue to participate in the onboarding by, for example, evaluating the trustworthiness of signed work orders issued by orchestrator 108, and complying with any signed work orders that can be validated as having been signed with the private key corresponding to the particular public key.

The aforementioned work orders may cause endpoint device 101A to, for example, modify its configuration, install/remove software, enable/disable various hardware components, establish accounts for end users, and/or perform other operations as directed by orchestrator 108. The aforementioned operations may place endpoint device 101A in an operating state that meets expectations of the final owner of endpoint device 101A (e.g., the operator of the deployment).

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor-based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, the processes and interactions shown in FIG. 2 may be used to facilitate endpoint device onboarding to a deployment when factory onboarding data loaded to the endpoint device is inadequate for completing the onboarding. Accordingly, the uptime of endpoint device may be improved, and desired computer-implemented services are more likely to be provided by the deployment.

Figure 3:
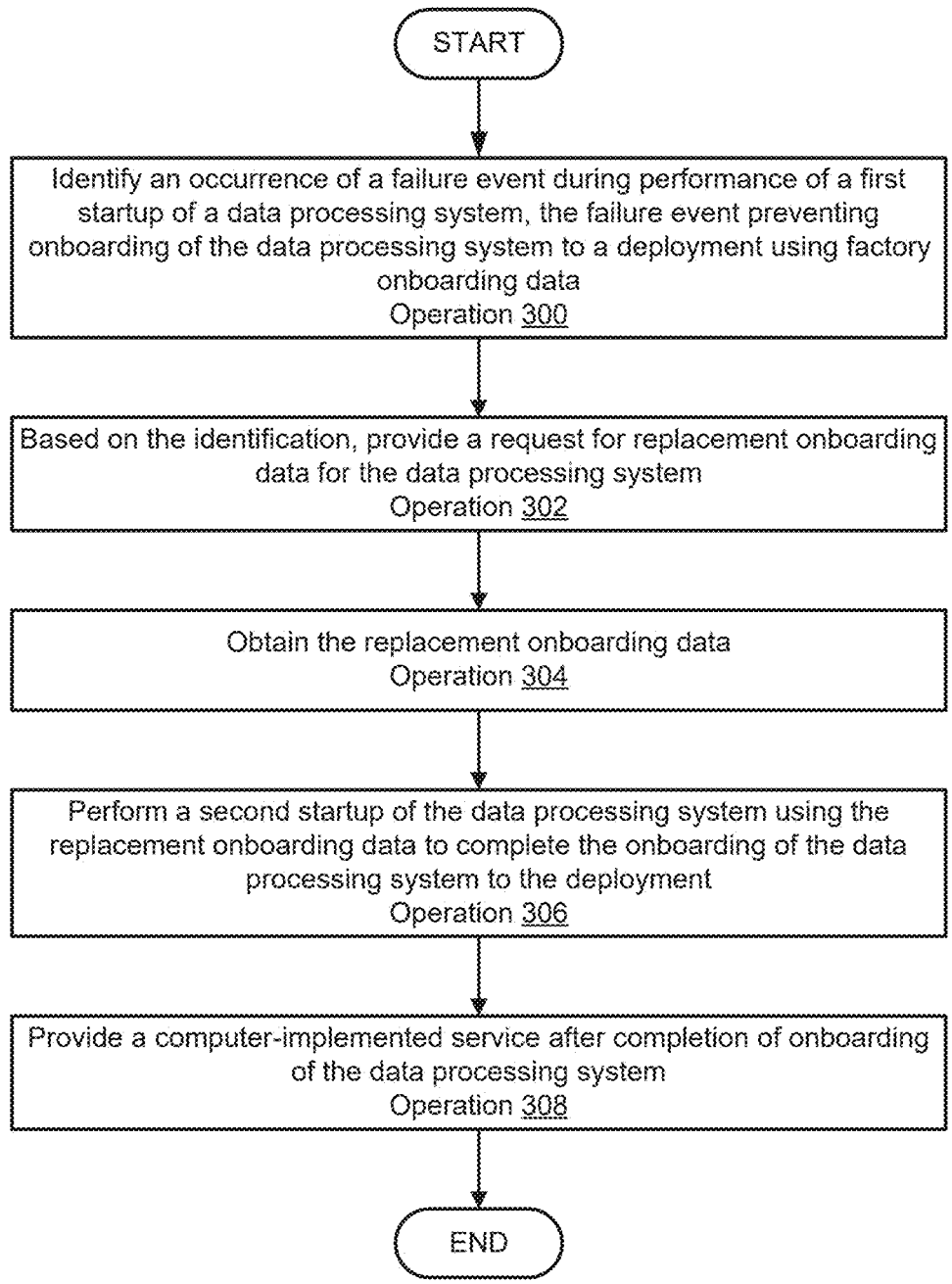
FIG. 3 shows a flow diagram illustrating a method in accordance with an embodiment.

As discussed above, the components of FIG. 1A may perform various methods to onboard endpoint devices. FIG. 3 illustrates a method that may be performed by the components of the system of FIGS. 1A-1J. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing onboarding of a data processing system (e.g., an endpoint device) in accordance with an embodiment is shown. The method may be performed by any of the components of the system shown in FIG. 1A.

Prior to operation 300, factory onboarding data may be installed on the data processing system. For example, the manufacturer may load pieces of software and/or configuration data such as a factory operating system usable to place the data processing system to a condition where onboarding of the data processing system to a deployment may be initiated. The configuration data may include a factory rendezvous address usable to locate a rendezvous system with information for redirection of the data processing system to an orchestrator that may facilitate the onboarding.

Once the data processing system is in possession of the final owner, the data processing system may be powered on, which may initiate a first startup of the data processing system. The data processing system may include in-band components (e.g., hardware resources) and out-of-band components (e.g., a management controller). Refer to the discussion of FIG. 1B for more details regarding components of the data processing system.

At operation 300, an occurrence of a failure event during performance of the first startup of the data processing system may be identified. The occurrence of the failure event may be identified by (i) obtaining a notification of the occurrence of the failure (e.g., by the management controller and from the hardware resources), and/or (ii) monitoring processes and/or activity of the data processing system.

For example, hardware resources may be unable to reach the rendezvous system at the factory rendezvous address, and may generate an error notification which may be provided to the management controller. Or, for example, the management controller may monitor activity of the hardware resources and detect a failure of a startup management entity to handoff management of the hardware resources to the factory operating system.

The occurrence of the failure event may prevent the startup process from completing and therefore the onboarding of the data processing system. The occurrence of the failure event may prompt management controller to request replacement onboarding data.

At operation 302, a request for replacement onboarding data for the data processing system may be provided to a management system. The request may be provided by (i) obtaining (e.g., generating) a data package including information regarding the failure event and/or other data (e.g., identifiers for the data processing system, cryptographically verifiable information), and (ii) transmitting the data package to the management system. For example, the management controller may obtain and transmit the data package via an out-of-band communication channel that may be established with the management system.

At operation 304, the replacement onboarding data may be obtained. For example, the replacement onboarding data may be obtained by (i) reading the replacement onboarding data from storage, (ii) receiving the replacement onboarding data (e.g., from another entity), and/or (iii) via other methods. The replacement onboarding data may be obtained, for example, by the management controller from the management system via an out-of-band channel.

The replacement onboarding data may include data usable to replace corrupt and/or stale factory onboarding data. For example, the onboarding data may include a replacement management entity for the data processing system, and/or a replacement rendezvous address (e.g., a valid rendezvous address).

Obtaining the replacement onboarding data may include transferring a copy of the replacement onboarding data to a startup management entity hosted by hardware resources of the data processing system so that the replacement onboarding data may be used by the startup management entity during the second startup. For example, the management controller may store a copy of the replacement onboarding data in shared memory accessible and known by the hardware resources. The management controller may also, for example, set a boot intercept flag that may indicate (e.g., to the startup management entity) that the replacement onboarding data is to be used in a subsequent startup of the data processing system.

At operation 306, a second startup of the data processing system using the replacement onboarding data to complete the onboarding of the data processing system to the deployment may be performed. The second startup may be performed by (i) identifying that a flag was set after the replacement onboarding data was obtained, and based on the flag being set, (ii) loading at least one software component to enable use of the replacement onboarding data during the second startup. For example, the flag may include the boot intercept flag set by the management controller, and upon reading the boot intercept flag, the startup management entity may load a software component that may enable the startup management entity to access the copy of the replacement onboarding data at its expected memory location.

Performing the second startup may also include (i) communicating with the rendezvous system to identify an orchestrator of the deployment using the replacement rendezvous address, and (ii) cooperating with the orchestrator to update operation of the data processing system to meet expectations of an operator of the deployment.

For example, communicating with the rendezvous system may include sending, by hardware resources of the data processing system, an onboarding request to the rendezvous system using the replacement rendezvous address. The rendezvous system may redirect the data processing system to an orchestrator of the deployment. Cooperating with the orchestrator to update operation of the data processing system may include (i) initiating communication with the orchestrator (e.g., by sending a message), and (ii) performing a cooperative onboarding process with the orchestrator. Refer to the discussion of FIG. 2 for more details regarding a cooperative onboarding process.

The endpoint device may complete onboarding in cooperation with the orchestrator by obtaining signed instructions from the orchestrator, attempting to verify the signed instructions, and perform any work orders that can be verified.

The instructions may include, for example, replacing an existing root of trust maintained by the endpoint device, modifying a configuration of the endpoint device, installing/removing software, and/or performing other actions that may place the endpoint device in condition to provide desired computer-implemented services that meet the expectations of an operator of the deployment (e.g., the orchestrator may include various policies that define the specific changes to the operation of the endpoint device that are to be made during onboarding).

At operation 308, a computer-implemented service may be provided after completion of onboarding of the data processing system. The computer-implemented services may be provided by obtaining computer instructions and executing the instructions using portions of hardware resources of the data processing system and/or other data processing systems (e.g., devices) of the deployment.

The method may end following operation 308.

Thus, using the method shown in FIG. 3, embodiments disclosed herein may manage completion of startup processes in order to facilitate onboardings even when factory onboarding data is inadequate for doing so.

Figure 4:
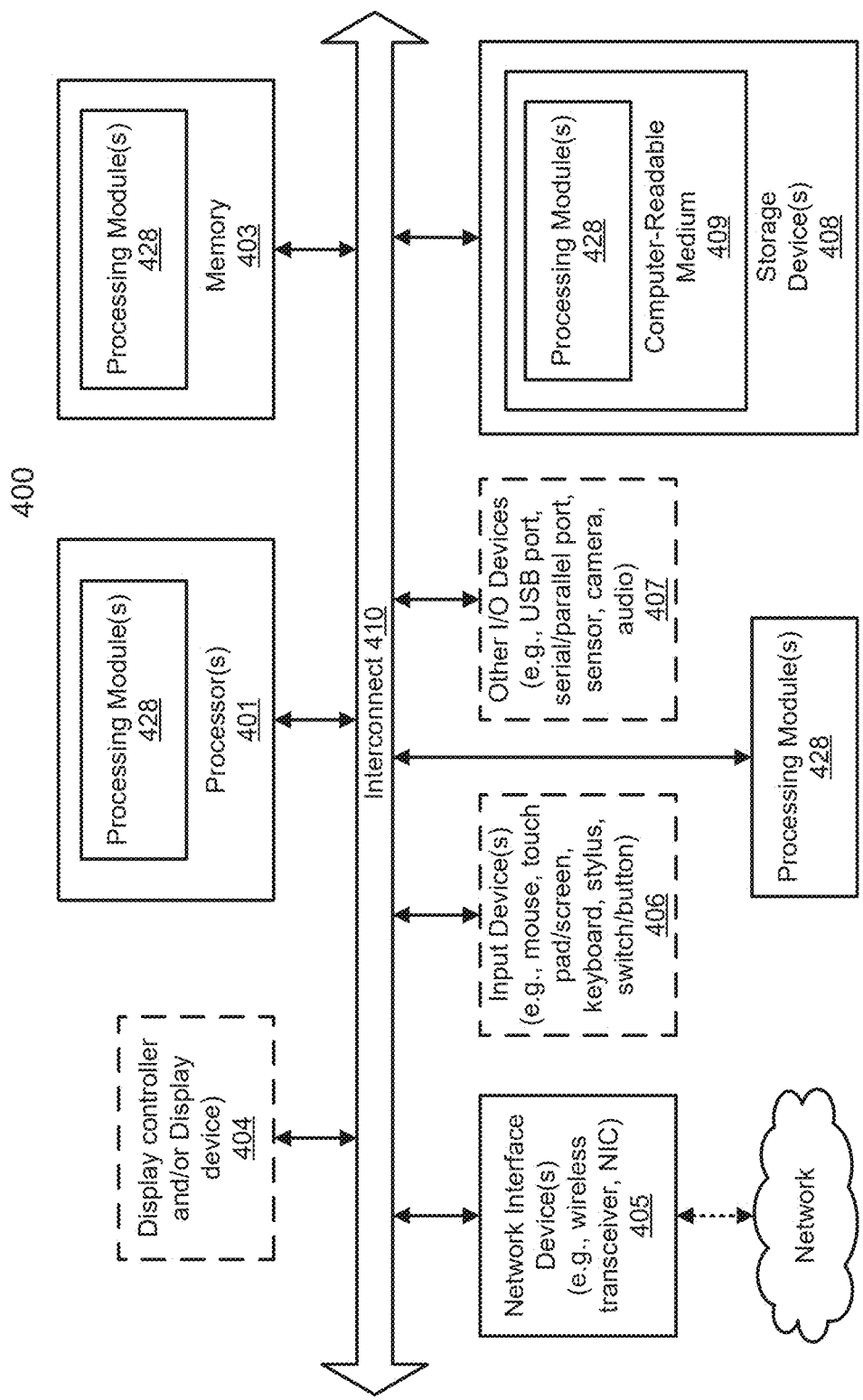
FIG. 4 shows a block diagram illustrating a data processing system in accordance with an embodiment.

Any of the components illustrated in FIGS. 1A-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing onboarding of a data processing system, the method comprising:
  identifying, by a management controller of the data processing system, an occurrence of a failure event during performance of a first startup of the data processing system, the failure event preventing onboarding of the data processing system to a deployment using factory onboarding data, and the failure event being a failure of the data processing system to communicate with a rendezvous system; and
  based on the identifying of the failure event:
    providing, by the management controller and to a management system, a request for replacement onboarding data for the data processing system, the replacement onboarding data comprising a replacement rendezvous address usable for performing the onboarding of the data processing system,
    obtaining, by the management controller and from the management system, the replacement onboarding data,
    performing, by the data processing system, a second startup of the data processing system using the replacement onboarding data to complete the onboarding of the data processing system to the deployment, and
    providing, by the data processing system, a computer-implemented service after completion of onboarding of the data processing system.

2. The method of claim 1, wherein the factory onboarding data is installed on the data processing system prior to the occurrence of the failure event.

3. The method of claim 1, wherein performing the second startup comprises:
  communicating with the rendezvous system to identify an orchestrator of the deployment using the replacement rendezvous address; and
  cooperating with the orchestrator to update operation of the data processing system to meet expectations of an operator of the deployment.

4. The method of claim 3, wherein obtaining the replacement onboarding data comprises:
  transferring a copy of the replacement onboarding data to a startup management entity hosted by hardware resources of the data processing system so that the replacement onboarding data may be used by the startup management entity during the second startup.

5. The method of claim 1, wherein performing the second startup comprises:
  identifying that a flag was set by the management controller after the replacement onboarding data is obtained.

6. The method of claim 5, wherein performing the second startup further comprises:
  based on the flag being set:
    loading at least one software component to enable use of the replacement onboarding data during the second startup.

7. A non-transitory machine-readable medium having instructions stored therein, which when executed by a processor, cause the processor to perform operations for managing onboarding of a data processing system, the operations comprising:
  identifying, by a management controller of the data processing system, an occurrence of a failure event during performance of a first startup of the data processing system, the failure event preventing onboarding of the data processing system to a deployment using factory onboarding data, and the failure event being a failure of the data processing system to communicate with a rendezvous system; and
  based on the identifying of the failure event:
    providing, by the management controller and to a management system, a request for replacement onboarding data for the data processing system, the replacement onboarding data comprising a replacement rendezvous address usable for performing the onboarding of the data processing system,
    obtaining, by the management controller and from the management system, the replacement onboarding data,
    performing, by the data processing system, a second startup of the data processing system using the replacement onboarding data to complete the onboarding of the data processing system to the deployment, and
    providing, by the data processing system, a computer-implemented service after completion of onboarding of the data processing system.

8. The non-transitory machine-readable medium of claim 7, wherein the factory onboarding data is installed on the data processing system prior to the occurrence of the failure event.

9. The non-transitory machine-readable medium of claim 7, wherein performing the second startup comprises:
  communicating with the rendezvous system to identify an orchestrator of the deployment using the replacement rendezvous address.

10. The non-transitory machine-readable medium of claim 9, wherein performing the second startup further comprises:
  cooperating with the orchestrator to update operation of the data processing system to meet expectations of an operator of the deployment.

11. The non-transitory machine-readable medium of claim 10, wherein obtaining the replacement onboarding data comprises:
  transferring a copy of the replacement onboarding data to a startup management entity hosted by hardware resources of the data processing system so that the replacement onboarding data may be used by the startup management entity during the second startup.

12. The non-transitory machine-readable medium of claim 7, wherein performing the second startup comprises:

identifying that a flag was set by the management controller after the replacement onboarding data is obtained.

13. The non-transitory machine-readable medium of claim 12, wherein performing the second startup further comprises:
based on the flag being set:
loading at least one software component to enable use of the replacement onboarding data during the second startup.

14. A data processing system, comprising:
a processor; and
a memory coupled to the processor to store instructions, which when executed by the processor, cause the processor to perform operations for managing onboarding of the data processing system, the operations comprising:
identifying, by a management controller of the data processing system, an occurrence of a failure event during performance of a first startup of the data processing system, the failure event preventing onboarding of the data processing system to a deployment using factory onboarding data, and the failure event being a failure of the data processing system to communicate with a rendezvous system, and
based on the identifying of the failure event:
providing, by the management controller and to a management system, a request for replacement onboarding data for the data processing system, the replacement onboarding data comprising a replacement rendezvous address usable for performing the onboarding of the data processing system;
obtaining, by the management controller and from the management system, the replacement onboarding data;
performing, by the data processing system, a second startup of the data processing system using the replacement onboarding data to complete the onboarding of the data processing system to the deployment; and
providing, by the data processing system, a computer-implemented service after completion of onboarding of the data processing system.

15. The data processing system of claim 14, wherein the factory onboarding data is installed on the data processing system prior to the occurrence of the failure event.

16. The data processing system of claim 14, wherein performing the second startup comprises:
communicating with the rendezvous system to identify an orchestrator of the deployment using the replacement rendezvous address.

17. The data processing system of claim 16, wherein performing the second startup further comprises:
cooperating with the orchestrator to update operation of the data processing system to meet expectations of an operator of the deployment.

18. The data processing system of claim 17, wherein obtaining the replacement onboarding data comprises:
transferring a copy of the replacement onboarding data to a startup management entity hosted by hardware resources of the data processing system so that the replacement onboarding data may be used by the startup management entity during the second startup.

19. The data processing system of claim 14, wherein performing the second startup comprises:
identifying that a flag was set by the management controller after the replacement onboarding data is obtained.

20. The data processing system of claim 19, wherein performing the second startup further comprises:
based on the flag being set:
loading at least one software component to enable use of the replacement onboarding data during the second startup.

* * * * *